No Printed Specification Available
T. Hinkley,
Chimney Cleaner.
No 6790X
Patented Oct. 7. 1831.
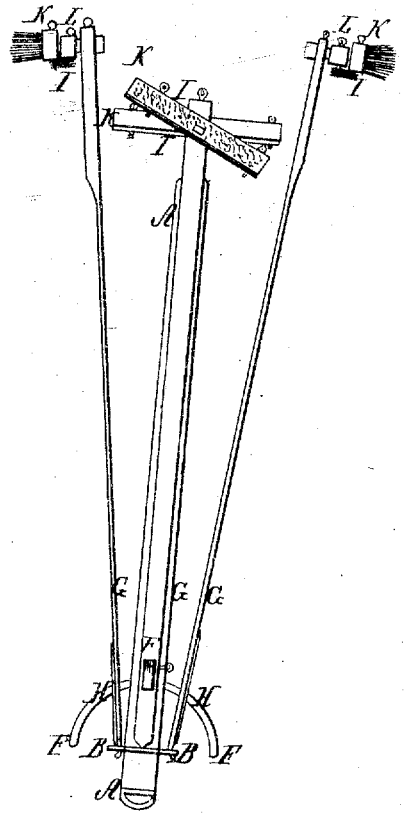

Oct. 7. 1831    6790X    [illegible]

Thomas Hinkley, of Hallowell State of Maine.

Letters Patent.

The schedule referred to in these Letters Patent and making part of the same con-
taining a description in the words of the said Thomas Hinkley himself of his improve
ment in the machine for cleaning chimneys.

To all to whom these presents shall come,
Be it known that I Thomas Hinkley of Hallowell in the County of Kennebec
and State of Maine have invented a new and useful improvement in the machine
for cleaning chimneys, and that the following is a full & exact description of the construc-
tion & operation of said Machine as invented or improved by me.
The Machine is composed of iron or steel, and is about five feet in
length, A the shaft with two eyes one at top for a cord to work the machine &
one at the bottom to hang a weight from if requisite. E. Two axes fixed into the
shaft at right angles to each other G four arms made to act with a spring
movement & to open upon the axes with adjusting screws H. when the arms
are adjusted to the size of the chimney, these screws fix them in that position,
The arms work upon the foot being loosely entered with a hook into the hoop B.
The arms may thus be taken off at pleasure & one, two, three, or four, may be used
at a time, as the case may require I The scraper K the brushes screwed down to
them. The scrapers are used alone when the brushes are removed. The scraper
and brush traverse together upon the short arm L, horizontally and being ad
justed to the chimney are then fixed with the screw. The short arm then works
in the main arm by a circular tenon or gudgeon, & being set so as to bring the
brush at a vertical angle suitable to the width of the chimney, is then fixed in
its place by the adjusting screw at the end of the main arm. The front brush
& scraper in the accompanying drawing is represented as adjusted to a narrow
chimney, The machine being adjusted (and having small cords passing from the
head of each arm thro' eyes in the upper end of the shaft to prevent the arms
catching in the chimney) is worked up & down by a person at the top of the
chimney having it [illegible] by a cord.    What I claim as new, and as

6790 X my own invention or discovery in the above described machine, and for the use of which I ask an exclusive privilege, is, First, the adjusting arcs with screws to regulate and fix the arms for the brushes & scrapers — Second, the action of the screws by which they press constantly against the side of the chimney. Third, the mode of adjusting the scrapers & brushes upon the arms according to the dimensions of the chimney.

Witnesses

Chas. Vaughan.
Chas. Vaughan Junr.

Thomas Hinkley

Exd.
Chgd.

[illegible]

560 [illegible]